Jan. 4, 1938.  A. L. SPAFFORD  2,104,060
CORRUGATED STRUCTURE
Filed Oct. 16, 1931   3 Sheets—Sheet 2
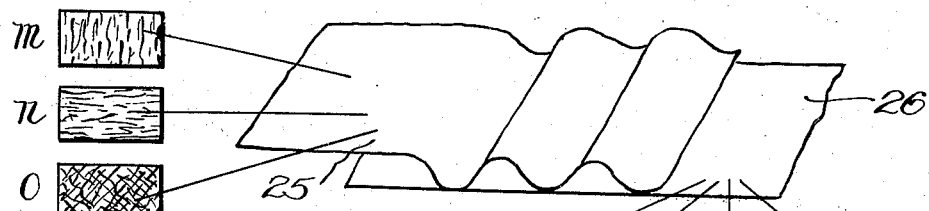
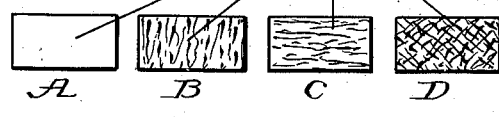
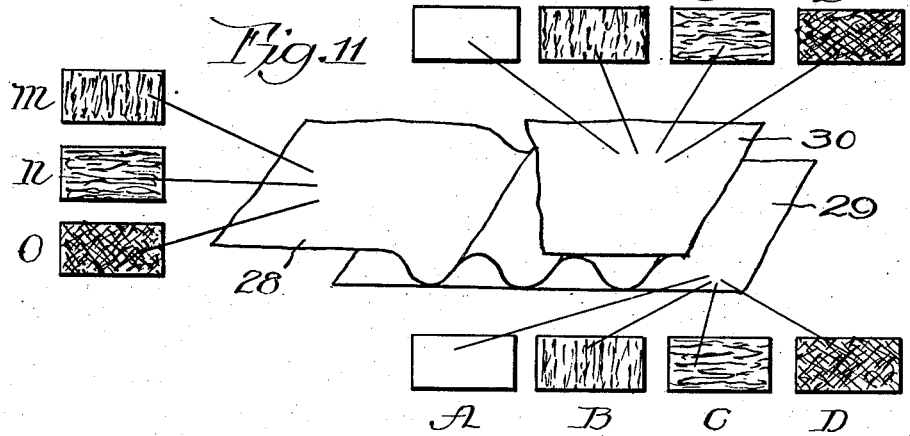
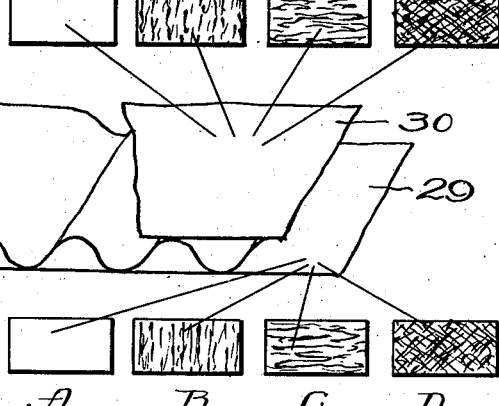
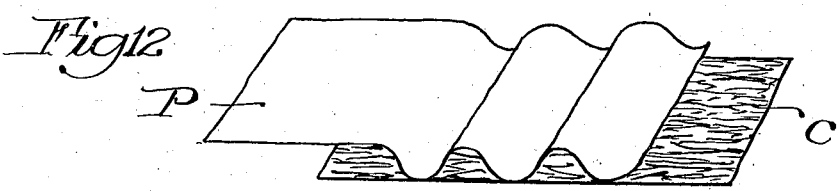
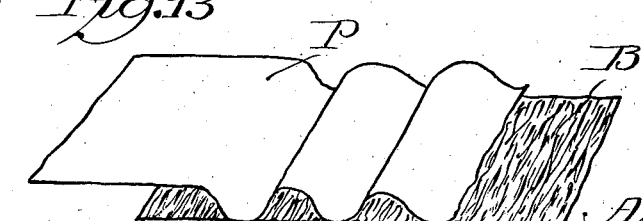
Inventor,
Allen L. Spafford,
By W. Bartlett Jones, Atty.
Witness:
Chas. R. Koursh.

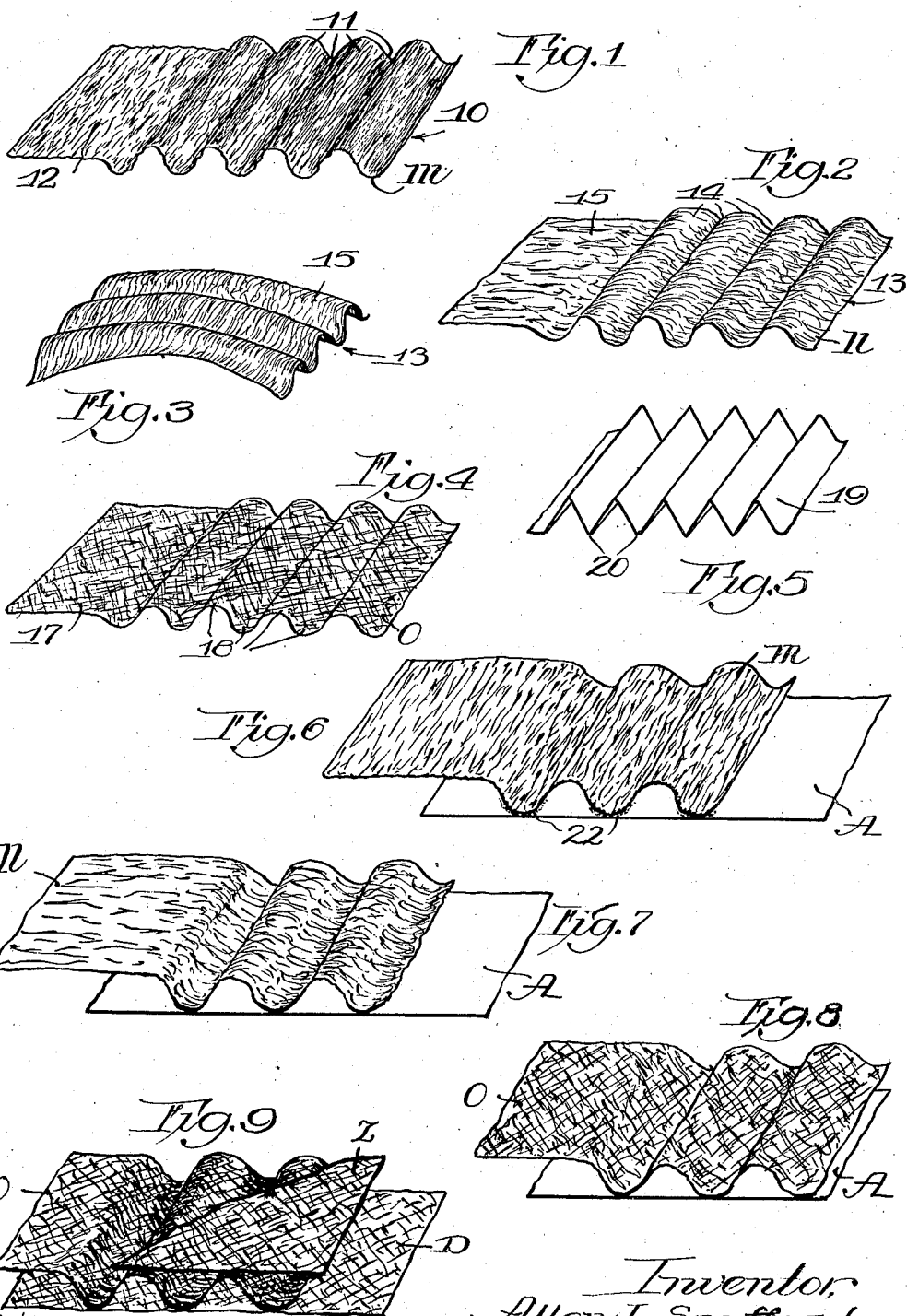

Jan. 4, 1938.     A. L. SPAFFORD     2,104,060
CORRUGATED STRUCTURE
Filed Oct. 16, 1931     3 Sheets-Sheet 3

Witness:
Chas. L. Koush

Inventor,
Allen L. Spafford
By W. Bartlett Jones, Atty.

Patented Jan. 4, 1938

2,104,060

UNITED STATES PATENT OFFICE 2,104,060

CORRUGATED STRUCTURE

Allen L. Spafford, Cloquet, Minn., assignor to Wood Conversion Company, Cloquet, Minn., a corporation of Delaware Application October 16, 1931, Serial No. 569,198

5 Claims. (Cl. 154—55)

The present invention relates to corrugated structures or sheets, represented by the so-called and well known corrugated board and corrugated paper.

Ordinary corrugated forms are made from paper and comprise essentially a corrugated sheet, which may be used alone, or which may be adhesively united to a single facing, or secured between two facings. It is made to have rigidity and in certain forms non-flexibility. The applications of it in use are largely those which take advantage of its rigidity, its non-flexibility, and its great strength for a light-weight cheap material.

Some of its chief disadvantages in such uses are its fragility when bent or broken, its brittleness as a structure, and its ease of puncturing. Another defect in common forms is the fact that it is not water-proof.

Aside from its desirable properties for structures, it has a high heat insulation value, particularly where it is used in pile formation. It also has sound deadening properties and it may be used for this property. In many forms of insulation, for heat and sound, strength and rigidity are not essential, and in other forms flexibility, toughness, elasticity, waterproofness and other qualities are very desirable.

The present invention aims to provide corrugated structures which may be more flexible than ordinary forms, and more elastic, and which may be water-proofed, and tough.

One object of the invention is to use in corrugated structures, a sheet of elastic material, or tough material, or highly flexible material, in such a way that these properties are imparted to the corrugated structure.

A particular object is to regulate and control the properties by the relative arrangement of the corrugations and the component parts of the structural element or elements.

Another object is to use in a corrugated structure one, two, or three elastic sheets, such as creped paper having parallel creping, and to arrange the creping lines either in parallel, or transverse or otherwise, to the corrugations to impart different degrees or to give particular directional properties to the structure.

Still another object of the invention is the use of one, two or three universally elastic sheets, such as diagonally and doubly creped sheets in a corrugated structure, with either plane sheets, or with parallel creped sheets.

Another object is to use water-proofed paper, such as asphalted, or creped asphalted paper in a corrugated structure.

Various other objects and advantages of the invention will become apparent from the following description of the invention and uses of the forms and structures which are shown in the accompanying drawings in which:

Fig. 1 represents a fragmentary section of a corrugated sheet having creping lines parallel with the corrugation.

Fig. 2 represents a corrugated sheet having creping lines at right angles to the corrugations.

Fig. 3 represents a curved corrugated sheet having creping lines transverse to the corrugations and represents the sheet of Fig. 2 deformed into the shape illustrated.

Fig. 4 represents a corrugated sheet having creping in two directions at right angles to each other and at 45° with the corrugations.

Fig. 5 represents a modified form of corrugated sheet in which the corrugations are sharp like accordion pleats.

Figs. 6, 7 and 8 represent respectively the corrugated sheets of Figs. 1, 2 and 4 faced with a plane liner.

Fig. 9 represents a corrugated sheet like that of Fig. 4 faced with two liners of diagonally creped sheets.

Fig. 10 is a schematic and diagrammatic representation of a single faced corrugated sheet including designations by illustration of the types of materials and arrangement thereof which may be used in combination in the structure, including particularly as the corrugated sheet a creped form.

Fig. 11 is a schematic and diagrammatic representation of a doubly faced corrugated sheet including designations by illustration of the types of materials and arrangement thereof which may be used in combination in the structure, including particularly as the corrugated sheet a creped form.

Fig. 12 represents a single faced corrugated plane sheet, the facing being creped and at right angles to the corrugations.

Fig. 13 represents a single faced corrugated plane sheet, the facing being creped parallel to the corrugations.

Figure 14:
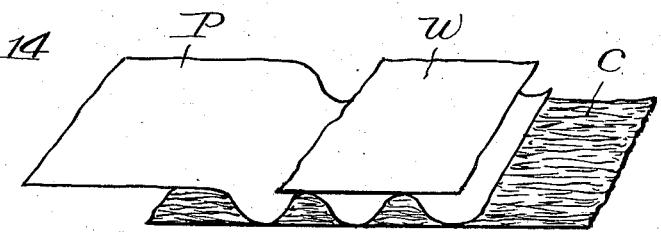
Fig. 14 represents a doubly faced plane corrugated sheet having one facing which is creped at right angles to the corrugations.

In explaining the nature of the invention it is deemed expedient to illustrate specifically only a few of the forms in which the invention may be embodied, for the reason that a very large number of other structures may be built up from different combinations of the various elemental forms. The properties of the built up structures may be controlled by the choice of different forms of the present invention. In the accompanying descriptions of the various illustrated forms, brief mention is made of various uses for which a particular form may be employed. In this way it is made easier to explain the advantage and specific merit of one form over other forms.

In practicing the invention the conventional relation of corrugated sheet to one or two liners or facings is maintained. In place of one, two, or three plane sheets, as of paper, in such structures I use in various combinations at least one elastic sheet, such as a creped sheet of paper. Various combinations of plane and elastic sheets may be used. I may use an elastic sheet which has uni-directional elasticity, such as a sheet of paper creped with parallel creping lines. I may use a sheet universally elastic, such as one having maximum elasticity in two directions, and hence elasticity in all directions, such as a sheet which is creped in two directions. Such a sheet is exemplified by paper having one set of parallel creping lines, crossed by another set of parallel creping lines, preferably at right angles to the first set, diagonally to a web of paper. Such a paper is elastic in all directions.

The two types of creped paper may be water-creped, or may be creped with asphalt or other heat-plastic adhesive, generally described in the U. S. patents to Rowe Nos. 1,628,515 and 1,782,767. Such sheets are water-proof and tough. They may be coated with asphalt, or other creping agent on only one side, and be uncoated on the other side. The sheets may be coated on two sides, so that both sides are water-proofed, as by asphalt or other agents, as described in my copending U. S. application Serial No. 557,564, filed August 17, 1931, now U. S. Patent No. 2,075,-835, issued April 6, 1937. Both the singly creped paper and the doubly creped paper may have either one side or both sides water-proofed.

The plane sheet which I may use in the various forms of this invention may also be water-proofed on one or both sides. It may be a duplex sheet, such as two paper sheets cemented together with a water-proofing agent like asphalt.

None of the above materials per se is new, or embody this invention, but each may be an element in combination with itself or with another form in various embodiments of this invention.

The varous combinations which are contemplated as falling within this invention using the specific elastic forms and plane sheets of material illustrated in the drawings number well over fifty.

In order not to burden the drawings and the description unnecessarily with all the specific forms, the disclosure is made somewhat diagrammatic and the description is schematic. The following keys to the combinations will readily explain the description and the drawngs. The illustrative materials used are:
 Plane sheets
 Parallel-creped sheets
 Diagonally creped sheets The parallel creped sheets have uni-directional elasticity and flexibility. The flexibility is less apparent as a uni-directional quality than is the elasticity. Because of its uni-directional structure and properties it may be used at various angles to the corrugations. I have illustrated its use in parallel with them and at right angles to them. In designating these two specific uses, the single material has been designated by two distinct indicia, according to the use, and it may be considered, merely for convenience in making combinations, as two materals. In fact it may be two materials when a web of it is considered, as in a roll, as distinguished from a fragment. When it is creped across the direction of formation it is a different material than when it is creped with the direction of formation. It is one material commercially, or in manufacture, when the parallel creping extends parallel with the length of the web of commerce, and another when the parallel creping extends parallel with the width of the web.

In designating any one material several indicia are used according to its position in the structure. Any one of the materials may be a facing or may be a corrugated sheet. When one is a corrugated sheet it is indicated by a letter from the middle of the alphabet. When one is a facing in a structure having only one facing, it is designated by a letter at the beginning of the alphabet. When one is a second facing it is designated by a letter near the end of the alphabet. The indicia are:

| Sheet | Single facing | Corrugated sheet | Second facing |
| --- | --- | --- | --- |
| Plane | A | P | W |
| Crepes parallel with corrugation | B | M | X |
| Crepes across corrugations | C | N | Y |
| Diagonally creped | D | O | Z |

With this explanation of the drawings and of the key to the description, the structures and some of the important combinations will be described. Some specific uses are described in my copending application Serial No. 569,197, filed concurrently herewith, and now U. S. Patent No. 2,045,733, issued June 30, 1936.

In Fig. 1 I illustrate a fragment 10 of corrugated sheet having parallel corrugations 11 and having creping 12 parallel to the corrugations. It is to be understood that the rigidity of the creped sheet is sufficient to sustain the corrugations, and that the variations or treatment of a plane sheet are proportioned to secure this. Such a sheet is particularly useful in combinations. It may be adhesively united to other sheets as will be hereinafter disclosed. It may be piled between separator sheets, or piled crosswise on each other in a package or laminated sheet which may be flexed or stretched. Because of the creping the stretching may be in the creping and not wholly in the corrugations. It may be used as a wrapping, having less rigidity than the similar prior art structure of plane paper. Its greater flexibility permits its use as a combination corrugated and plane flexible wrapper. When creped with asphalt it is waterproof and very tough against tear and puncture. It permits assembly of itself or its combinations into structures which may be compressed at an edge, or even internally in localized spots to provide respectively a highly flexible flange, or a highly flexible area.

In Fig. 2 a parallel creped sheet 13, which may be of the character described for Fig. 1, is corrugated at 14 transversely of the creping 15. It has a distinctive property that it can be curved as shown in Fig. 3 without loss of its corrugated form. The crepings permit unequal stretching of the sheet. The curvature may be in both directions in a single sheet. A curved article may be wrapped with such a sheet and it may be used in a package or blanket of insulation which may be made in irregular shape. A sheet curved like that in Fig. 3 may be cemented to one or two liners to make a curved or non-planar section in a corrugated sheet. It may readily be stretched. It is very tough and has a flexibility and elasticity not found in simple corrugated sheets of plane paper.

In Fig. 4 a universally elastic sheet such as diagonally creped paper 17 is corrugated at 18. This sheet combines all the properties of the sheets of Figs. 1 and 2 and has in addition greater elasticity and flexibility.

In Fig. 5 I show a conventional representation of a sheet 19 with accordion pleating 20 in a sheet which gives substantially the same advantages as the conventional curved or sinuous form of corrugations. It has an additional advantage of being more easily compacted when squeezing of it is desirable. In this description I aim to include within the broad term corrugated, the pleated form as well as the sinuous form. However, it is to be appreciated that where an adhesive is used to secure a liner, the sinuous form offers more area for adhesive than does the pleated form. The sheet 19 may therefore be made into any elastic sheet form, such as I have described.

In Fig. 6 a creped sheet M (corrugated) such as shown in Fig. 1 is secured to a single facing of plane sheet A such as paper. The plane sheet A may be water-proofed. Adhesive is indicated at 22. This may be sodium silicate, casein, starch or animal glue, or a water-proof cement like asphalt. The sheet MA has great flexibility. The corrugated side is tougher and more resistant to puncture or tear than is the conventional similar form made from two plane papers. Where the sheet M is asphalt creped paper it is a waterproofed one. The asphalt of creping may be on either side, or asphalt may be on both sides. It is particularly useful where it is desired in making a flexible or tough flange or area as previously suggested, either in a single sheet of it, or in a pile of them.

In Fig. 7 a sheet N (Fig. 2) is united with a plane sheet A as a facing. The creping is across the corrugations. This sheet NA is highly flexible across the corrugations without breaking the structure. It may be wrapped in a curve of short radius. An edge flange crossing the corrugations may be formed by compressing the edge, and the flange is highly tough and flexible, so that it may be folded or rolled into a mounting strip.

In Fig. 8 the structure OA is formed, or may be formed and used in ways similar to structures MA and NA with all the advantages of the latter and with increased degree, and with additional advantages.

Fig. 9 is representative of a two-faced sheet. It is illustrated specifically as made of three sheets, all universally elastic, such as the diagonally creped paper previously described, and its combination is DOZ. It stretches and flexes easily in all directions. The sheets employed may be altered to other forms as will appear hereinafter. The diagonally creped asphalted sheets are preferred because of their extremely tough, flexible and water-proof character.

In Fig. 10 a diagrammatic illustration of one phase of the invention is shown, relating to a single-faced corrugated sheet. A corrugated sheet 25 may be made of the materials selected from the list M, N and O. A facing 26 may be made of materials selected from the list A, B, C and D. For example, the following combinations are contemplated:
MA, MB, MC, MD, NA, NB, NC, ND, OA, OB, OC and OD. Of these, MA, NA, and OA have been specifically described with reference to Figs. 6, 7 and 8 respectively.

In Fig. 11 a two-faced corrugated structure is shown diagrammatically comprising a corrugated sheet 28, one facing 29, and a second facing 30. The sheet 28 may be selected from the list M, N and O. The sheet 29 may be selected from the list A, B, C and D. The sheet 30 may be selected from the list W, X, Y and Z. This is all illustrated in the drawings. The following combinations are contemplated: (either W, or X or Y or Z) (either M, or N, or O) (either A, or B, or C, or D). Of these the combination ZOD has been specifically described with reference to Fig. 9.

Figure 15:
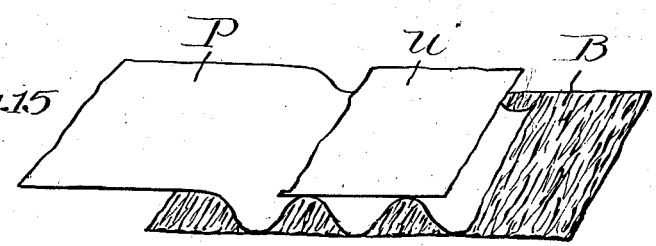
Fig. 15 represents a double faced plane corrugated sheet having one face creped parallel to the corrugations.

The invention is not limited to changes in the prior art from the corrugated plane sheet, and the latter may be used in combination with elastic facings. For example, I have made the combinations PC (Fig. 12), PB (Fig. 13), CPW (Fig. 14) and BPW (Fig. 15). In all of these sheets C and B may be of creped asphalted paper, waterproofed on one or both sides as desired. Such forms are suitable for making water-proof cartons. The creped paper is preferably used on the outside of a carton, to resist water, and to provide a tough surface which is difficult to break, tear or puncture. Rigidity and flexibility may be provided in varying degrees by the arrangement of the parts. Forms PC and PB have great flexibility along the corrugations, and it is more pronounced in PB. For cartons, where less flexibility is desirable, form PC is preferred. The flexibility and toughness is used advantageously in insulation structures as heretofore described. Where less flexibility is desired in a tough surfaced structure form CPW (Fig. 14) is preferred. Form BPW (Fig. 15) is extremely flexible along the corrugations because of the elasticity in the creped sheet B. This form may be wrapped about a curved surface with sheet W against the surface. Stretching in sheet B prevents rupture of the structure.

Figure 16:
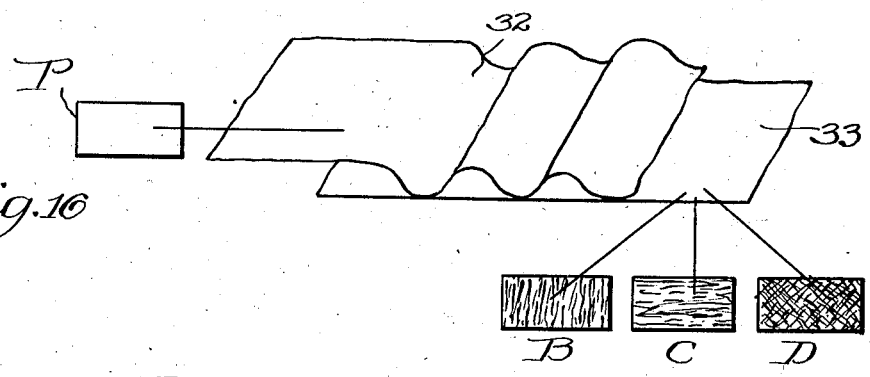
Fig. 16 is a schematic and diagrammatic representation of a single faced corrugated sheet including designations by illustration of the types of materials and arrangement thereof which may be used in combination in the structure, including particularly as the corrugated sheet a plane sheet.
Figure 17:
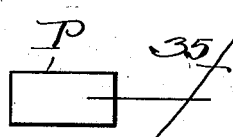
Fig. 17 is a schematic and diagrammatic representation of a double faced corrugated sheet including designations by illustration of the types of materials and the arrangement thereof which may be used in combination in the structure, including particularly as the corrugated sheet a plane sheet.

Various other combinations are contemplated as illustrated diagrammatically in Fig. 16 and Fig. 17. In Fig. 16 a single faced structure is illustrated as having a plane corrugated sheet 32 and a liner or facing 33. The liner 33 may be selected from the list B, C and D. Of the several combinations, the structures PB and PC have been described in reference to Figs. 13 and 12 respectively.

In Fig. 17 the two-faced structure is illustrated, as having a plane corrugated sheet 35, one facing 36, and a second facing 37. The sheet 36 may be selected from the list B, C and D. The sheet 37 may be selected from the list X, Y and Z. The combinations may be: (either B, or C, or D) (P) (either X, or Y, or Z). Of these combinations BPW has been described in reference to Fig. 15, and CPW in reference to Fig. 14.

It is to be understood that the direction of elasticity in a sheet in the structure has a relation to the direction of corrugations. For example where parallel corrugations and a set of parallel creping lines cross on a diagonal, the elasticity from the creping is imparted both along and across the corrugations, whether the creping lines and the corrugations be in one sheet, or in different sheets in a composite structure. Thus in Fig. 4 but one set of the creping lines diagonal to the corrugations makes the sheet elastic in the direction of the ridges and valleys of the corrugations.

From the foregoing it will be understood that the present invention contemplates a corrugated structure, of sheet material, such as paper, which includes an elastic sheet, such as a creped sheet having uni-directional or universal elasticity and other functional properties. The elastic sheet may be one or more of the essential parts of corrugated structures, and all such parts may be elastic sheets. In the accompanying claims the invention is defined broadly to include all the forms illustrated, described or suggested, and such modifications thereof as fall within the scope of the invention as defined by the claims.

Reference is made to applicant's copending divisional application Serial No. 157,817, filed August 7, 1937, for matter disclosed herein and not specifically claimed.

I claim:

1. A corrugated sheet which is initially creped in two crossing directions.

2. A composite structure comprising essentially a sheet having parallel corrugations, which sheet is creped with lines diagonal to said corrugations to provide stretch in the direction of the lines of corrugation, and a flexible facing sheet secured thereto, said composite corrugated structure being flexible transversely of corrugation.

3. A composite structure consisting of a sheet having parallel corrugations, which sheet is creped with lines diagonal to said corrugations to provide stretch in the direction of the lines of corrugation, and a flexible facing sheet secured to each face of said corrugated sheet, one of said facing sheets being creped to provide stretch in the direction of the lines of corrugation.

4. A composite structure consisting of a sheet having parallel corrugations, which sheet is creped with lines diagonal to said corrugations to provide stretch in the direction of the lines of corrugation, and a flexible facing sheet secured to each side of said corrugated sheet, each facing sheet being creped to provide stretch in the direction of the lines of corrugation.

5. A composite structure comprising essentially a sheet having parallel corrugations, which sheet is creped to provide stretch in the direction of the lines of corrugation, and a flexible facing sheet secured on one side which is creped to provide stretch in the direction of the lines of corrugation, said composite corrugated structure being flexible transversely of corrugation.

ALLEN L. SPAFFORD.